United States Patent [19]
Choi

[11] Patent Number: 5,517,483
[45] Date of Patent: May 14, 1996

[54] GEAR ASSEMBLY FOR TRANSPORTING A ROTATION FORCE OF A MOTOR SHAFT TO A LEAD SCREW

[75] Inventor: Young S. Choi, Seoul, Rep. of Korea

[73] Assignee: Daewoo Electronics Co., Ltd., Seoul, Rep. of Korea

[21] Appl. No.: 269,382

[22] Filed: Jun. 30, 1994

[30]      Foreign Application Priority Data

Jun. 30, 1993  [KR]  Rep. of Korea ................. 93-12330

[51] Int. Cl.⁶ .............................. G11B 21/16; F16H 1/28
[52] U.S. Cl. ..................... 369/255; 369/219; 475/162; 475/178
[58] Field of Search ................... 369/215, 219, 369/223, 244, 249, 44.14, 44.21, 44.11, 221, 255; 475/162, 178, 179

[56]            References Cited

U.S. PATENT DOCUMENTS

| | | | |
|---|---|---|---|
| 4,825,432 | 4/1989 | Takahashi | 369/219 |
| 4,843,911 | 7/1989 | Minegishi et al. | 475/102 |
| 4,884,844 | 12/1989 | Kershaw et al. | 475/162 |
| 5,123,884 | 6/1992 | Kondoh et al. | 475/178 |
| 5,175,723 | 12/1992 | Guha | 369/244 |
| 5,232,413 | 8/1993 | Zheng et al. | 475/162 |

FOREIGN PATENT DOCUMENTS 2217094  10/1989  United Kingdom .................. 369/219

*Primary Examiner*—Aristotelis Psitos
*Assistant Examiner*—Thang V. Tran
*Attorney, Agent, or Firm*—Nixon & Vanderhye

[57]                ABSTRACT

The present invention relates to a gear assembly which comprises an eccentric member having a first cylindrical portion with a first center axis in accordance with a center axis of said eccentric member for receiving said shaft on a front side thereof fronting said motor, and a second cylindrical portion with a second center axis on a back side thereof, said second center axis being eccentrically disposed with said first center axis; a pinion gear equipped with a radial ball bearing in its center, having a first hole, a second hole opposing said first hole, a first number of teeth and a first diameter, said first and second holes being parallel with a center line thereof and said said radial ball bearing being inserted into said second cylindrical portion; With the structure of the gear assembly for a pickup unit feeding apparatus, it is permitted to miniaturize the size of a pickup unit feeding apparatus as well as to exactly control the pickup unit.

7 Claims, 3 Drawing Sheets

GEAR ASSEMBLY FOR TRANSPORTING A ROTATION FORCE OF A MOTOR SHAFT TO A LEAD SCREW

BACKGROUND OF THE INVENTION

1. Field of the Invention

The present invention relates to a gear assembly for a pickup unit feeding apparatus of a disk player, more particulary to a gear assembly for a pickup unit feeding apparatus of a disk player with a hypocycloid gearing structure for simplifying the structure of the pickup unit feeding apparatus and exactly controlling the feeding of the pickup unit.

2. Description of the Prior Art

The disk player is a system which records information onto or reproduces the same from a recording medium such as a disk. In general, in the disk player, recording or reproducing of information onto or from the disk is performed by a pickup unit. In order to record or reproduce information, the pickup unit is moved in a radial direction of the disk placed on a disk player.

FIG. 1 is a perspective view for showing a conventional pickup unit feeding apparatus. As shown in FIG. 1, a pulley 12 fixed to the shaft of a motor is engaged with a gearing portion 14 by a belt 16 to thereby reduce a speed of the motor. The gearing portion 14 reduces the speed of the motor, and the reduced speed is transmitted to a rack gear 18 meshed with the gearing portion 14, thereby feeding the rack gear 18. A pickup unit 10 in one body with the rack gear 18 is also fed along a guide bar 19 to thereby record and reproduce information onto or from a disk.

The conventional pickup feeding apparatus having a structure as mentioned above has a gearing portion which is constituted with many different sized gears in order to reduce a rotation speed of a motor.

Therefore,there exists drawbacks in that it is difficult to make a disk player miniaturized, a malfunction is likely to be caused by a belt connecting a pulley and a gear portion, and noises can be also made by engaging many gears.

SUMMARY OF THE INVENTION

The object of the present invention is to provide a gear assembly for a pickup unit feeding apparatus of a disk player in a hypocycloid gearing for simplifying the structure the pickup unit feeding apparatus and concisely controlling the pickup unit.

In order to achieve the above object, a gear assembly for a pickup unit feeding apparatus of a disk player according to one embodiment of the present invention comprises an eccentric member having a first cylindrical portion with a first center axis in accordance with a center axis of said eccentric member for receiving said shaft on a front side thereof fronting said motor, and a second cylindrical portion with a second center axis on a back side thereof, said second center axis being eccentrically disposed with said first center axis;

a pinion gear equipped with a radial ball bearing in its center, having a first hole, a second hole opposing said first hole, a first number of teeth and a first diameter, said first and second holes being parallel with a center line thereof and said radial ball beating being inserted into said second cylindrical portion;

a stopper on said second cylindrical poriton for preventing said second cylindrical portion from separating from said radial ball bearing;

a transmitting member having a first and a second protrusions respectively being inserted into said first and second holes of said pinion gear on a front side, and having a groove for receiving said lead screw on a back side, for extracting and transmitting a reduced speed to said lead screw: and a pinion engagement support portion including a base for supporting said motor, a first wall portion having a hole for receiving said shaft, a second wall portion having an internal gear for accommodating and meshing with said pinion gear and a third wall portion having a hole for receiving an end portion of said lead screw, said internal gear having a second number of teeth and a second diameter larger than said first diameter and said first, second and third wall portions being formed on said base.

In the above structure of a gear assembly for a pickup unit feeding apparatus,the pinion gear is rotated on its axis and eccentrically revolved around the internal gear when a motor is driven. Since there exists a difference of number of teeth between the pinion gear and the internal gear, a reduced rotation speed can be obtained by the teeth number difference with an offset of the rotation and revolution of the pinion gear and transmitted to the lead screw.

Therefore,the pickup unit can be concisely controlled to be fed along the guide bar and the pickup unit feeding apparatus can be constructed with a simplified structure.

DETAILED DESCRIPTION OF THE PREFERRED EMBODIMENT

Figure 1:
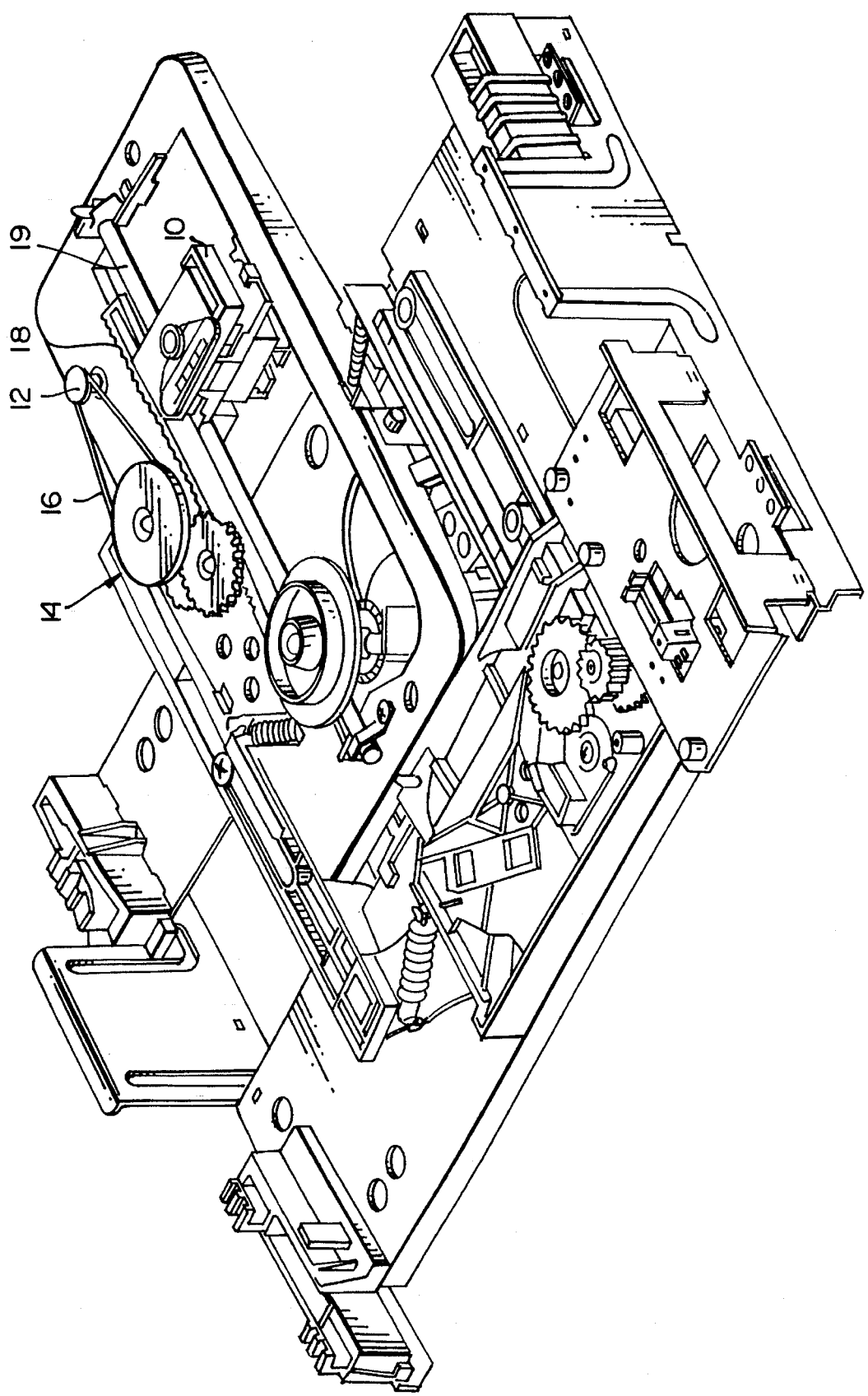
FIG. 1 is a perspective view showing a conventional pickup unit feeding apparatus for a disk player.
Figure 2:
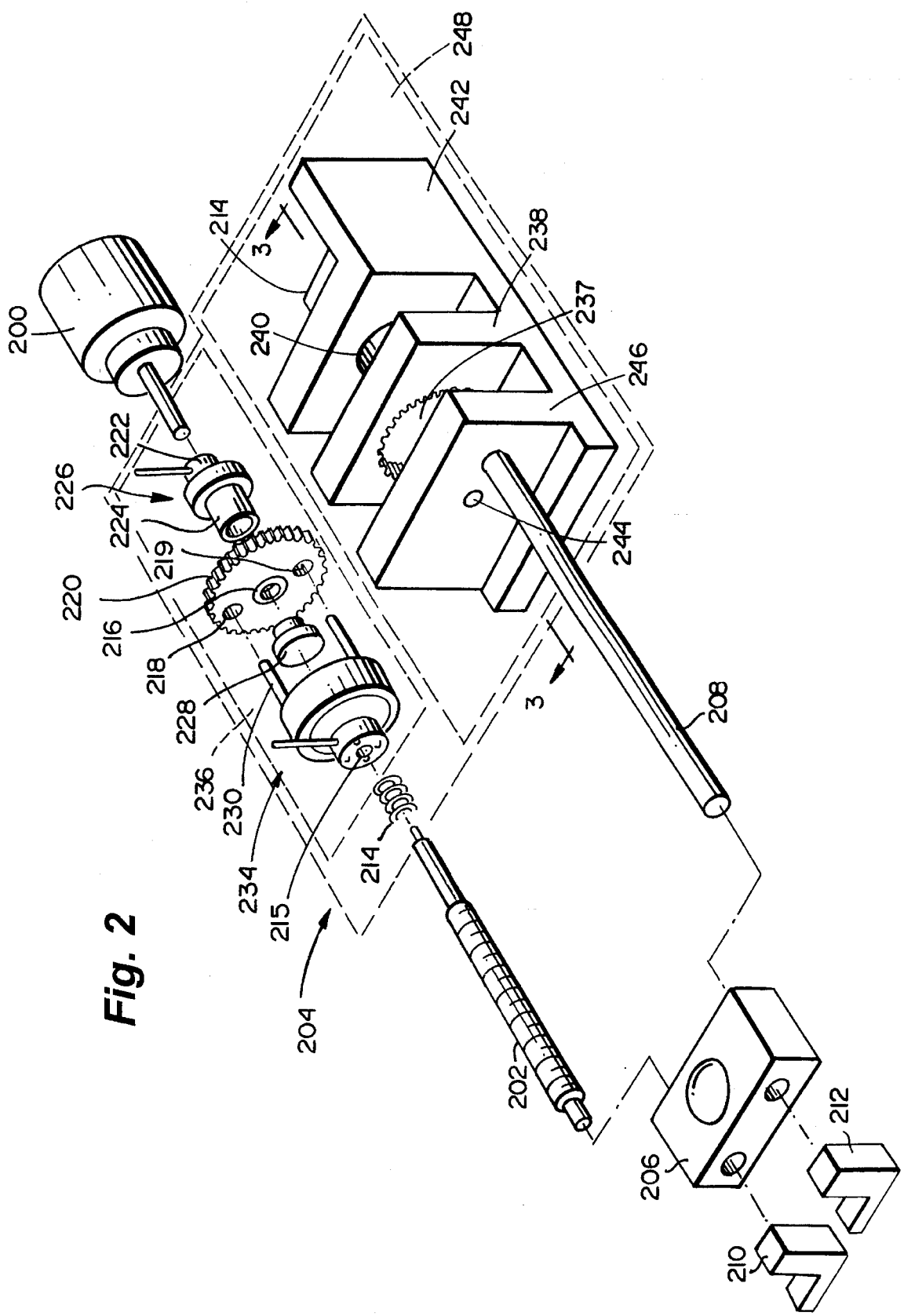
FIG. 2 is an exploded view of a pickup unit feeding apparatus with a gear assembly for a disk player according to one embodiment of the present invention.
Figure 3:
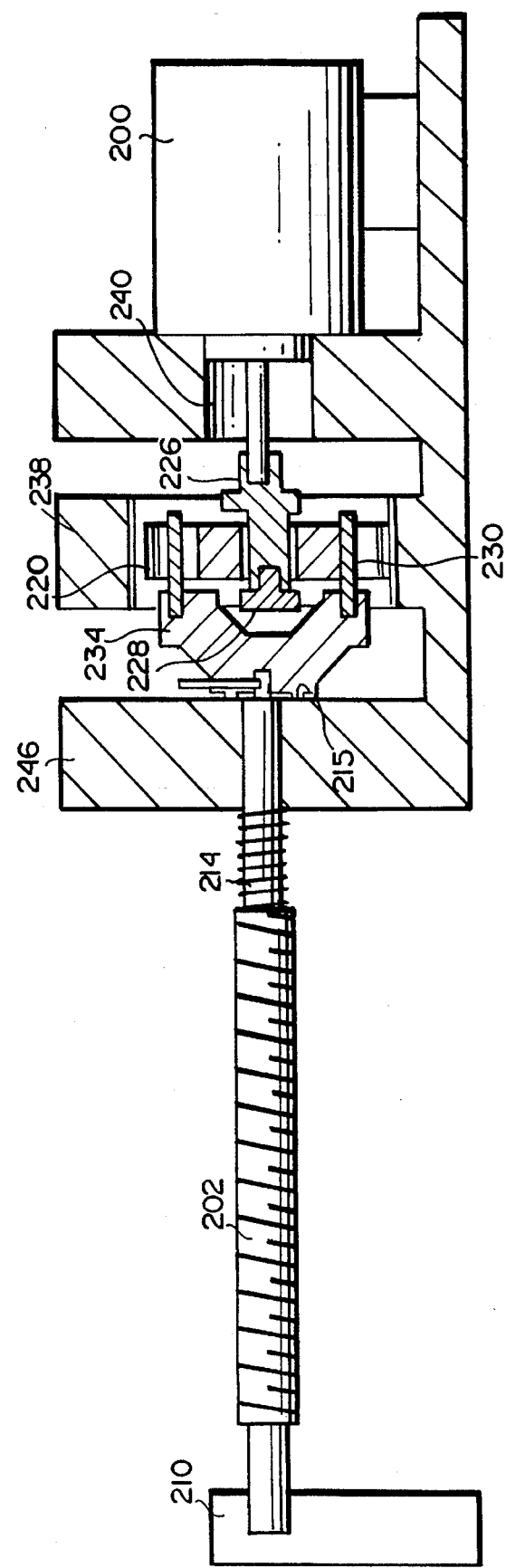
FIG. 3 is a cross sectional view of a gear assembly for a pickup unit feeding apparatus of a disk player of FIG. 2, which is taken along X—X line.

FIG. 2 is an exploded view of a pickup unit feeding apparatus with a gear assembly for a disk player according to one embodiment of the present invention, and FIG. 3 is a cross sectional view of a gear assembly for a pickup unit feeding apparatus of a disk player of FIG. 2, which is taken along X—X line.

As shown in FIG. 2 and 3,the pickup unit feeding apparatus for a disk player according to one embodiment of the present invention comprises a motor 200; a pickup unit 206; a lead screw 202; a speed reduction portion 204 mounted on the chassis (not shown) and for reducing a rotation speed of motor 200 and rotating lead screw 202 at the reduced speed; a guide bar 208 mounted in parallel to lead screw 202 and for guiding pickup unit 206; a guide bar support member 212 mounted on the chassis and for supporting one end portion of the guide bar 208; and a coil spring 214 mounted between speed reduction portion 204 and lead screw 202 to elastically support lead screw 202 and for limiting the feeding of pickup unit 206.

Here, speed reduction portion 204 includes a motor speed reduction engagement portion 236 and a pinion engagement support portion 248, wherein motor speed reduction engagement portion 236 has a pinion gear 220 having a radial ball bearing 216 and two holes 218, 219 opposing to each other; an eccentric member 226 having a first cylindrical portion 222 with a first center axis in accordance with a center axis of eccentric member 226 for receiving a shaft on a front side thereof fronting motor 200, and a second cylindrical portion 224 with a second center axis on a back side thereof, said second center axis being eccentrically disposed with said first center axis; a stopper 228 on second cylindrical poriton 224 for preventing second cylindrical portion 224 from separating from said radial ball bearing 216; and a transmitting member 234 having a first and a second protrusions 230, 231 respectively being inserted into first and second holes 218, 219 of pinion gear 220 on a front side, and having a groove 215 for receiving lead screw 202 on a back side, for extracting and transmitting a reduced speed to lead screw 202:

and wherein pinion engagement support portion 248 includes a base 241 for supporting motor 200, a first wall portion 242 having a hole 240 for receiving a motor shaft, a second wall portion 238 having an internal gear 237 for accommodating and meshing with pinion gear 220 and a third wall portion 246 having a hole 244 for receiving an end portion of lead screw 202, internal gear 237 having a second number of teeth and a second diameter larger than the first diameter and the first, second and third wall portions 237, 242, 246 being formed on base 241.

A diameter of first hole 218 is equal to that of second hole 219 and the diameter is also equal to a distance between the first center axis and the second axis. A difference between a diameter of pinion gear 220 and that of internal gear 237 is equal to a distance between the first center axis and second axis. And also a difference between a teeth number of pinion gear 220 and that of internal gear 237 is one or more.

In the pickup unit feeding apparatus for a disk player according to one embodiment of the present invention, when motor 200 is driven to be rotated, eccentric member 226 is rotated which is engaged with the shaft of motor 200. With this rotation of eccentric member 226, pinion gear 220 is eccentrically revolved in internal gear 237 of second wall portion 238 along the inner circumference of internal gear 237 while being in part meshed with pinion gear 220, and at the same time rotated with respect to its own center axis.

A direction of the revolution of pinion gear 220 becomes contrary to a direction of the rotation of the same since the revolution direction is determined by the rotation direction of motor 200 but the rotation of pinion gear 220 is withstood by meshed teeth to thereby be rotated in a direction contrary to the revolution direction. Therefore, an offset is made between the rotation and revolution of pinion gear 220 so that only a rotation according to a difference of number of teeth between pinion gear 220 and internal gear 237 is extracted through transmitting member 234 to thereby rotate lead screw 202 at a reduced speed.

The rotation of lead screw 202 at the reduced speed reduces a feeding speed of pickup unit 206 along guide bar 208, thereby making capable of exactly controlling pickup unit 206. And an engagement of only two gears for a reduction of the rotation speed enables the structure of the pickup unit feeding apparatus simplified.

Spring 214, which is mounted between transmitting member 234 and lead screw 202, prevents pickup unit 206 from further forwarding beyond a screw portion of lead screw 202 in order for pickup unit 206 not to be jammed between lead screw 202 and pinion engagement support portion 248.

As described above, with the structure and operations according to one embodiment of the present invention, it is permitted to miniaturize the size of a pickup unit feeding apparatus as well as to exactly control the pickup unit.

What is claimed is:

1. A gear assembly for transporting a rotation force of a shaft of a motor to a lead screw, said gear assembly comprising:

an eccentric member having a first cylindrical portion with a first center axis in accordance with a center axis of said eccentric member for receiving said shaft on a front side thereof fronting said motor, and a second cylindrical portion with a second center axis on a back side thereof, said second center axis being eccentrically disposed with said first center axis;

a pinion gear equipped with a radial ball bearing in its center, having a first hole, a second hole opposing said first hole, a first number of teeth and a first diameter, said first and second holes being parallel with a center line thereof and said radial ball bearing being inserted into said second cylindrical portion;

a stopper on said second cylindrical poriton for preventing said second cylindrical portion from separating from said radial ball bearing;

a transmitting member having a first and a second protrusions respectively being inserted into said first and second holes of said pinion gear on a front side, and having a groove for receiving said lead screw on a back side, for extracting and transmitting a reduced speed to said lead screw; and a pinion engagement support portion including a base for supporting said motor, a first wall portion having a hole for receiving said shaft, a second wall portion having an internal gear for accommodating and meshing with said pinion gear and a third wall portion having a hole for receiving an end portion of said lead screw, said internal gear having a second number of teeth and a second diameter larger than said first diameter and said first, second and third wall portions being formed on said base.

2. The gear assembly as claimed in claim 1, further comprising an elastic member for elastically supporting said lead screw, said elastic member being mounted between said lead screw and said transmitting member.

3. The gear assembly as claimed in claim 2, wherein said gear assembly is used for pickup unit feeding apparatus in a disk player and said elastic means limits said pickup unit from further forwarding beyond said screw portion of said lead screw.

4. The gear assembly as claimed in claim 1, wherein a diameter of said first hole is equal to that of said second hole and said diameter is also equal to a distance between said first center axis and said second axis.

5. The gear assembly as claimed in claim 1, wherein a difference between a diameter of said pinion gear and that of said internal gear is equal to a distance between said first center axis and second axis.

6. The gear assembly as claimed in claim 1, wherein a difference between a teeth number of said pinion gear and that of said internal gear is one or more.

7. The gear assembly as claimed in claim 1, wherein said elastic member is a coil spring.

* * * * *